Inventors:
William P. Oehler
Charles H. Youngberg.

Patented Jan. 27, 1953

2,626,552

UNITED STATES PATENT OFFICE 2,626,552

CONDUIT SUPPORT FOR VEHICLE TRAINS WITH CONDUIT-CONNECTED FLUID DEVICES

William P. Oehler and Charles H. Youngberg, Moline, Ill., assignors to Deere & Company, Moline, Ill., a corporation of Illinois Application November 19, 1948, Serial No. 60,956

2 Claims. (Cl. 97—50)

This invention relates to improvements for use in a vehicle train, such as a propelling vehicle having connected thereto a trailing vehicle or implement. More particularly, the invention relates to means for supporting a flexible conduit that interconnects fluid devices carried respectively on the propelling and trailing vehicles.

Although the principles of the invention may have wide application, the invention is designed primarily for use in an agricultural unit comprising a tractor to which an implement is connected by separable hitch means. The tractor will include a fluid device, such as a hydraulic pump, and a fluid device, such as a hydraulic motor, will be provided on the implement and connected to the pump by fluid-transmitting means including a flexible conduit. The fluid motor on the implement is used for adjusting the implement or a part thereof, as is well understood by those versed in the art.

Inasmuch as the hitch between the tractor and implement includes provision for relative articulation of the two, and further inasmuch as it is desirable in the usual case to employ the conduit and motor in connection with several implements that may be connected to the tractor, the conduit is ordinarily substantially longer than the normal distance measured on a straight line longitudinally between the pump and motor. It is customary in cases of this type to provide means for supporting the intermediate portion of the conduit in sinuous or looped form intermediate its ends, so that this portion of the conduit will be sustained in a position clear of the ground and clear of any possibility of its being damaged by relative movement of the tractor and implement.

In the case of a tractor-drawn harrow, for example, the hitch pin may break or the hitch may be separable or extensible so that in the event that the implement strikes an obstruction, the tractor may continue forwardly, at least to a limited extent, without damaging either the tractor or implement or main parts of the hitch. Even in cases wherein no provision has been made for deliberate separation or extension of the hitch, such separation may occur accidentally as the result of breakage of one of the parts. As an adjunct to this arrangement, it is customary to provide a releasable coupling in the fluid-transmitting conduit so that when the conduit is subjected to extreme tensional forces following release or extension of the hitch, the coupling may separate and prevent damage to the conduit or its related components.

According to the present invention, an improvement is provided for use in and in combination with units or vehicle trains of the type referred to above, an important object of the invention relating to the provision of means for supporting the slack or looped conduit in such manner that it is normally clear of the ground and free from any possibility of damage, this means being effective to allow the conduit to straighten under tensioning forces prior to separation of the coupling, after which the means is effective to sustain the conduit in such position that it will be clear of the ground, thus keeping exposed re-connectible portions of the conduit free from the accumulation of dirt.

Another important object of the invention is to provide the conduit-supporting means in the form of deflectable means that accommodates changes in position of the conduit as the conduit is placed under tension. A further important object is the provision of means in the supporting structure providing for upward movement thereof after deflection so that it may effectively support the conduit in a position clear of the ground.

Further important objects of the invention are to provide: A relatively simple and inexpensive supporting means that may be readily incorporated in existing arrangements; a support including resilient or biasing means either additional to or inherent therein for accommodating the function thereof; and, in general, improvement in the use and operation of tractors and implements or equivalent interconnected vehicles.

The foregoing and other important objects and desirable features inherent in and encompassed by the invention will become apparent to those versed in the art as a preferred form of the invention is fully disclosed in the following detailed description and accompanying sheets of drawings in which.

Figure 1:
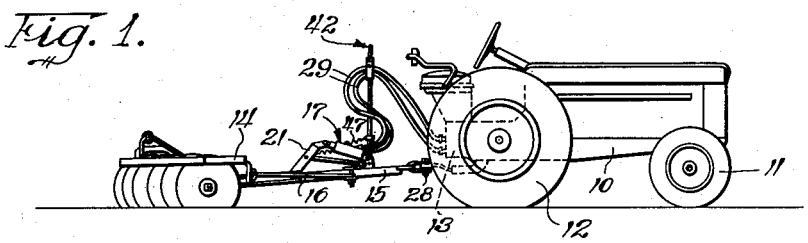
Figures 1, 2 and 3 are schematic illustrations representing first, a tractor and connected implement, second, disconnection of the hitch means between the two, and, third, separation of the fluid-transmitting means incident to complete separation between the tractor and implement.

The tractor illustrated is of a type well known commercially and has a longitudinal body 10 carried on front and rear wheels 11 and 12, respectively, and including power control or power lift means provided therein as an integral unit, such means being enclosed in a casing designated generally by the numeral 13. Several examples of a construction of this type are familiar to those versed in the art and, inasmuch as the particular type of fluid device forms no part of the present invention, no further illustration and description will be made beyond that necessary to explain, in general, the relationship of the device to the remainder of the organization illustrated.

The tractor 10 provides a propelling unit or vehicle which forms part of a vehicle train including a trailing unit, such as an implement or another vehicle. In the present case, an implement is illustrated as having a frame 14 representing generally a disk harrow. It will be understood, of course, that the carrier means could be used as well with any other type of implement. That shown, however, will suffice for the purposes of illustration.

Figure 4:
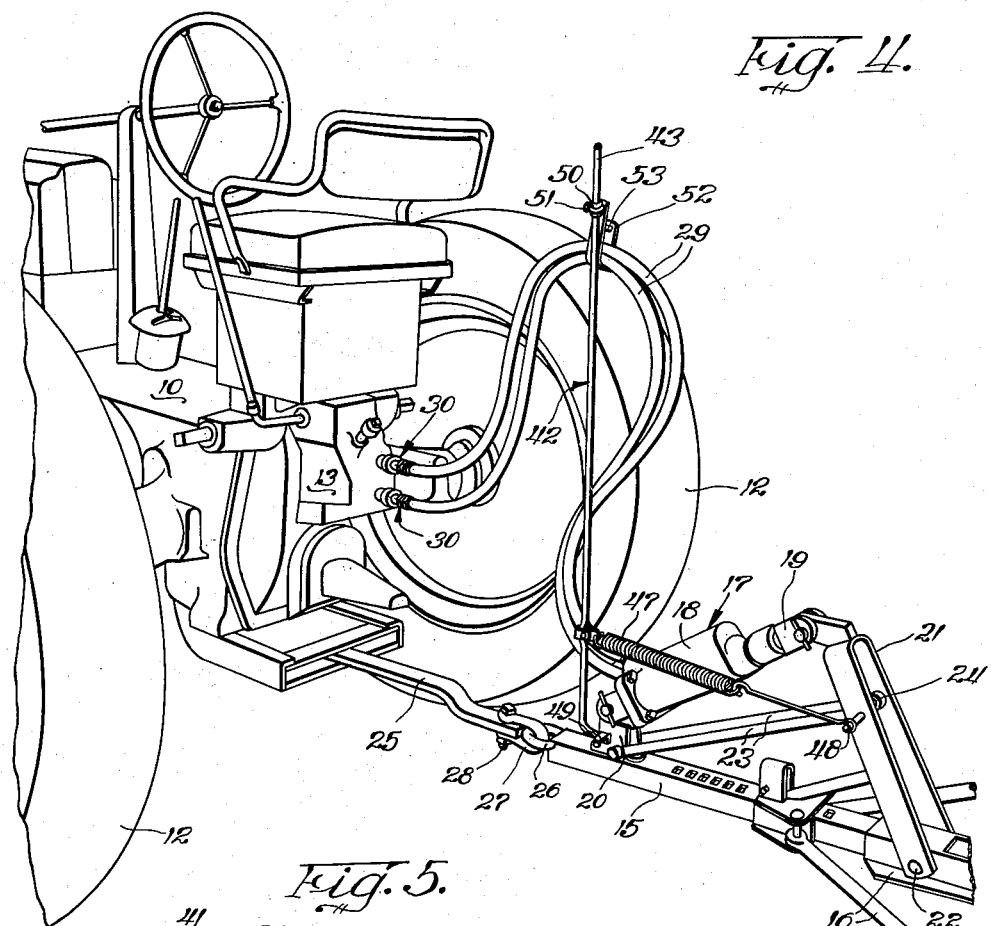
Figure 4 is an enlarged fragmentary perspective view showing the relationship between the tractor, a portion of the implement, and the supporting means for the fluid-transmitting means.

The harrow may be of any conventional construction including a main forwardly extending hitch part 15 which provides part of the hitch means for connecting the harrow to the tractor. Secondary frame structure 16 is slidable fore and aft on the hitch part or member 15 for the purpose of angling the harrow gangs, as is well understood. The means for effecting fore and aft sliding of the secondary frame 16 with respect to the hitch member 15 comprises, as here shown, a fluid-pressure device in the form of a hydraulic motor 17 which includes a cylinder 18 and a piston having a piston rod 19. The cylinder 18 is carried at its closed end on a suitable supporting bracket 20 and extends rearwardly and upwardly so that the free end of the piston rod 19 may be connected to the upper end of a fore and aft swingable lever 21 which is pivoted at 22 on part of the secondary frame 16 (Figure 4). A pair of tie rods 23 extends between the bracket 20 and an intermediate part of the lever 21 to establish a fulcrum 24. It will be seen that expansion and contraction of the parts of the motor 17 will effect rocking of the lever 21 about the fulcrum 24 to move the parts 15 and 16 relatively toward each other or apart as desired. The particular details form no part of the present invention and the illustration and description thereof should not be taken as imposing any limitations upon the applicability of the principles of the invention to other situations.

The hitching of the implement 14 to the tractor is accomplished by the member 15 and a drawbar structure on the tractor, the latter including a rearwardly extending draft member 25 to which the member 15 is connected by a ring 26, a clevis 27 and a hitch pin 28. The pin 28 is relatively frangible as compared to the other parts of the hitch and is therefore subject to breakage in the event that the implement encounters an obstruction or obstacle of sufficient size. In this respect, the pin comprises a breakable or separable part of the hitch and breakage thereof under conditions such as those referred to prevents damage to other parts of the arrangement.

The type of hitch illustrated could as well be replaced by any well known form of releasable or cushion hitch especially designed for the purpose. The particular type of hitch will not, as will be seen, materially affect the operation of the carrier structure to be presently described.

The cylinder-piston assembly or motor 17 may be of the two-way type in which both extension and contraction are accomplished by fluid under pressure; or, it may be of the one-way type in which extension is accomplished by fluid under pressure and contraction is accomplished by exhausting fluid from the cylinder under the influence of backing the tractor toward the stationary harrow. According to the present invention, it is immaterial which type of system is employed, that shown being of the two-way type. The fluid or hydraulic system, including the fluid device on the tractor and the fluid motor on the implement, further includes fluid-transmitting means interconnecting the devices, this means here being shown as comprising a pair of flexible conduits such as conventional reenforced rubber hoses 29. Each of the conduits may be provided at one end with an appropriate fitting for connection to the motor 17. The other end of each conduit includes a coupling—designated generally by the numeral 30—for connecting said conduit to the housing 13 of the tractor fluid device. Each coupling will be described in detail below.

Figure 5:
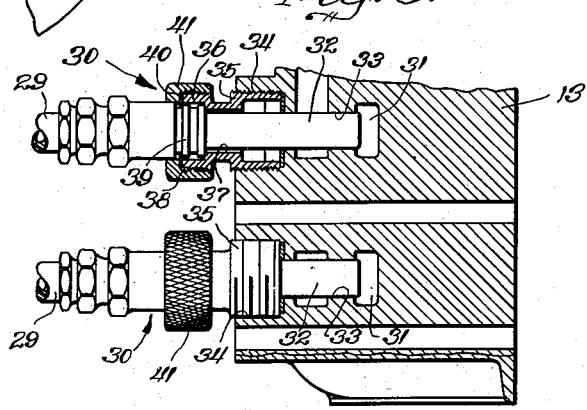
Figure 5 is a fragmentary sectional view, on an enlarged scale, showing a representative type of separable or releasable coupling.
Figure 6:
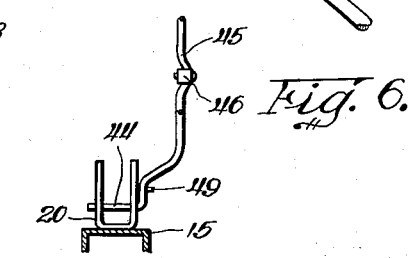
Figure 6 is a fragmentary detail view showing the configuration of the supporting rod and the manner of its connection to the support on the implement.

The fluid device on the tractor, which includes the casing 13, may also include a conventional fluid pump, not shown here since it may be of any type and its relationship to the remainder of the structure is obvious. As shown in Figure 5, the casing 13 is provided with a pair of fluid-transmitting passages 31 respectively in communication with the conduits 29 by means of nipples 32. The nipples 32 form part of the couplings 30, referred to above. Figure 5 illustrates one of the couplings in section. Since both couplings are identical, only one will be described.

The coupling 30 includes, in addition to the nipple 32, a passage or bore 33 in the casing 13 through which the nipple extends to communicate the conduit 29 with the passage 31. The bore 33 includes an internally threaded counterbore 34 which receives an externally threaded fitting 35. This fitting has an outer externally threaded portion 36 and a bore 37 coaxial with the bore 33 and surrounding the nipple 32. The fitting 35 includes within the externally threaded portion 36 a counterbore 38 which receives an annular rib or flange 39 preferably formed integral with the nipple 32. A frangible shear washer 40, of the segmental type, is positioned behind the annular rib 39 and is secured in place by an internally threaded collar 41 carried on the externally threaded portion 36 of the fitting 35. The coupling 30 thus connects the conduit to the casing 13 under normal operating conditions, but the washer 40 may shear in response to the application of extreme tensional forces to the conduit. Ordinarily, conditions resulting in the application of tensional forces to one conduit will have a similar effect on the other conduit and it is expected that both shear washers will shear simultaneously. In this respect, the conduit 29 may be considered a single fluid-transmitting element or means.

Fluid-pressure systems of the type illustrated herein are customarily provided in such manner that the cylinder-piston assembly or motor 17 and conduits 29 may be used with various types of implements. For that reason, the conduits 29 are ordinarily of substantial length. Further, this increased length is required in instances where there is considerable articulation between the interconnected vehicles. In any event, the conduits 29 are substantially longer than the distance measured along a straight or direct line between the fluid devices 13 and 17. Therefore, the conduits will assume a looped or sinuous form between the devices. Opposite end portions of the conduits are sustained in position clear of the ground by means of their connection to the fluid devices. The slack intermediate portions of the conduits are supported in a position clear of the ground by means of a conduit carrier, here designated generally by the numeral 42.

The preferred form of carrier illustrated comprises a first part or member provided for affixation to the trailing unit, this member here being included in or forming part of the support 20 on the hitch member 15 of the harrow 14. The carrier includes a second part or member in the form of a rod 43 which normally extends upwardly or occupies an upright position with respect to the supporting part 20. The lower portion of the rod is bent at 44 to provide means forming a pivot on an axis transverse to the line of draft between the tractor and implement, the support 20 being appropriately apertured to carry the portion 44. The upper portion of the rod 43 is displaced from a direct line between the fluid devices 13 and 17, the displacement in the present instance being vertically above such direct line. An intermediate portion of the rod 43 is kinked or offset to provide a portion at 45 to which connection may be made by a clip 46 for connection of one end of a tension spring 47 to the rod. The other end of the spring 47 may be connected at 48 to part of the implement 14.

The spring 47 thus serves as biasing means normally maintaining the rod 43 in its upright position; and stop means, in the form of a lug 49 on the support 20, is provided for limiting rearward swinging of the rod.

The upper portion of the rod 43 is provided with a collar 50 which has an adjusting screw 51 so that the collar may be adjusted vertically on the rod. A carrier clip 52 is connected to the collar and serves to engage the conduits 29. The manner in which the clip 52 engages the conduits 29 is such that the conduits are sustained against vertical displacement but may have sliding movement horizontally. The upper portion of the clip 52 may be closed by a removable pin 53 which further restricts the conduits 29 against vertical displacement, at least upwardly.

Figure 2:
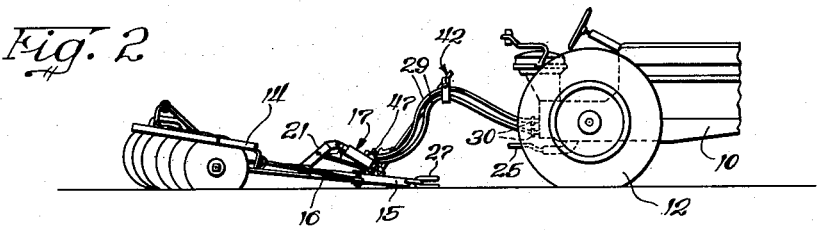
Figure 3:
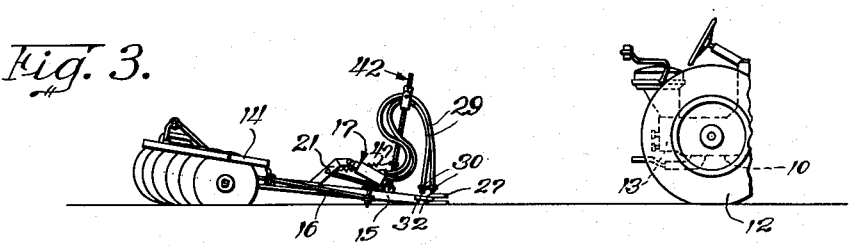

The operation of the vehicle train and the functioning of the carrier can best be observed by comparing Figures 1, 2 and 3. Figure 1 represents the parts during normal operation, wherein opposite end portions of the conduits 29 are sustained by their connections to the fluid devices, and the intermediate looped or sinuous portions of the conduits are sustained by the carrier 42.

When the implement strikes an obstruction of sufficient magnitude as to result in separation of the hitch (breakage of the pin 28 in the present instance), the tractor can, obviously, continue forwardly without the implement. Inasmuch as the conduits 29 remain connected, a limited amount of forward movement of the tractor without the implement can be accommodated before the conduits are placed in tension. After the hitch separates, and the tractor continues forwardly, the carrier 42 swings or is deflected forwardly against the loading of the spring 47, as best seen in Figure 2. Thus, the intermediate looped or sinuous portions of the conduits are permitted to approach a direct line between the fluid devices as the conduits 29 straighten under tension. As soon as the tensional forces applied to the conduits 29 exceed a predetermined maximum, the shear washers 40 shear and the couplings 30 separate from the casing 13, the nipples 32 pulling out of the passages 33. The spring 47 is sufficiently strong to return the carrier 42 to its upright position, as represented in Figure 3. It is expected that the clip 52 will be adjusted to a height sufficient to keep the nipples 32 from dragging on the ground.

From the foregoing, it will be seen that the carrier accommodates deflection as the hoses straighten under the application of tensional forces so that a direct pull may be had on the shear washers 40. In this respect, it should be understood that any other suitable disconnectible coupling may be used in place of that illustrated, several types of which are well known to those versed in the art. The deflection of the carrier against the loading of the spring 47 is followed by return of the carrier to its normal position so that the disconnected ends of the conduits are supported in positions clear of the ground. This alone is an important feature, since it is undesirable to allow dirt or other foreign particles to come in contact with the exposed nipples 32, which result cannot be otherwise avoided, since the nipples are wet with hydraulic fluid.

Other features and objects of the invention not specifically enumerated above will undoubtedly occur to those versed in the art, as will various modifications and alterations in the preferred form of the invention illustrated and described, all of which may be achieved without departing from the spirit and scope of the invention as defined in the appended claims.

What is claimed is:

1. For use with a propelling vehicle and a trailing unit, such as an implement or another vehicle, interconnected for forward travel in unison by means including a separable hitch, wherein the propelling vehicle and trailing unit respectively have fluid devices spaced apart longitudinally when the propelling vehicle and unit are normally hitched and wherein the fluid devices are interconnected by a flexible, sinuous or looped fluid-transmitting conduit that is connected to the propelling vehicle fluid device by a coupling that is separable in response to the application of excess forces thereto, as when the hitch separates and the propelling vehicle continues ahead without the trailing unit: a conduit carrier comprising a support for mounting on the trailing unit; a rod having a lower bent end, providing a pivot on a transverse axis and connected to the support for forward and rearward swinging, and an upright portion extending above a direct line between said devices; stop means between the rod and support for limiting rearward movement of the rod; biasing means normally holding the rod upright and against the stop means but yieldable to accommodate forward swinging of the rod; and means connected to the upright portion of the rod at a point thereon above a direct line between the devices for supporting the conduit in looped form.

2. For use in a tractor-trailer unit in which the tractor has a fluid device and a rear draft member and the trailer has a fluid device and a forward frame member and in which the draft and frame members are separably connected for release in the event of excessive draft forces, and wherein the fluid devices are interconnected by a looped fluid-transmitting conduit which is substantially longer than the distance between the vehicles when normally hitched and which includes a separable-coupling connected to the tractor fluid device: a conduit carrier, comprising a mounting part having means for the affixation thereof to the trailer frame member; an elongated carrier part having upper and lower end portions and normally positioned with its lower end portion proximate to the mounting part and its upper end remote from the mounting part to normally project in an upright position to a point spaced sufficiently above a direct line between the fluid devices so as to support a looped intermediate portion of the conduit normally clear of the hitch and frame members; means on said upper end portion for supporting such looped portion of the conduit as aforesaid; means pivotally connecting the carrier part at its lower end to the mounting part for downward and forward deflection toward, and upward and rearward return from, a direct line between the fluid devices; and biasing means connected to the carrier part and normally maintaining said carrier part in the aforesaid normal upright position but yieldable to provide for deflection of the carrier part when the hitch and draft members separate and the conduit is tensioned, and said biasing means being further effective to return the carrier part and supported conduit to said upright position upon release of the conduit coupling.

WILLIAM P. OEHLER.
CHARLES H. YOUNGBERG.

REFERENCES CITED

The following references are of record in the file of this patent:

UNITED STATES PATENTS

| Number | Name | Date |
|---|---|---|
| 1,444,315 | Hirschler | Feb. 6, 1923 |
| 2,027,085 | Brashears | Jan. 7, 1936 |
| 2,253,462 | Mulder | Aug. 19, 1941 |
| 2,274,527 | Buran et al. | Feb. 24, 1942 |